June 12, 1923.
E. SCHWARZ
FLEXIBLE COUPLING
Filed May 21, 1921
1,458,894
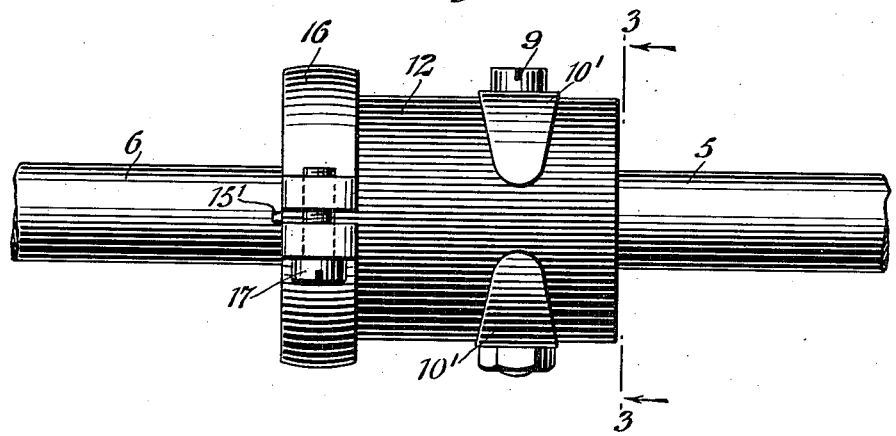
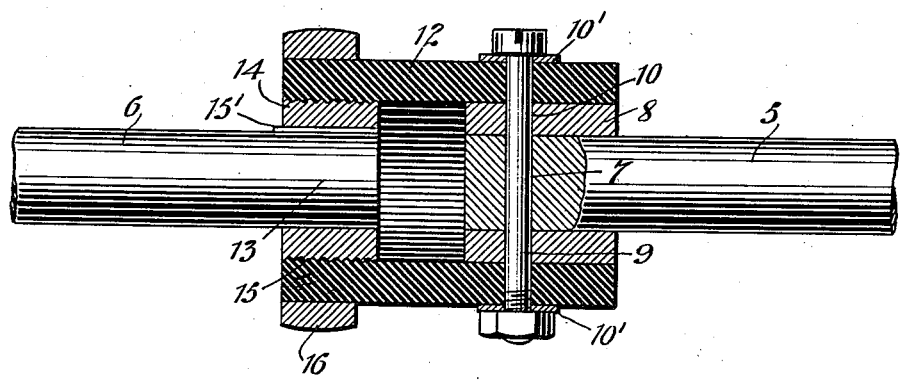
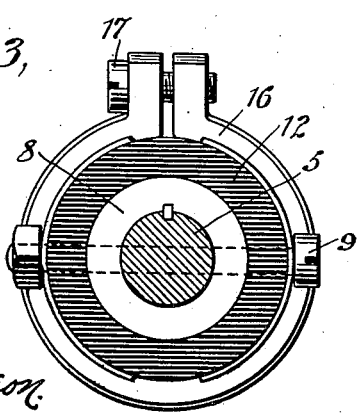
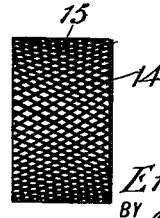
WITNESSES
INVENTOR
Ernest Schwarz
BY
ATTORNEYS Patented June 12, 1923.

1,458,894

UNITED STATES PATENT OFFICE.

ERNEST SCHWARZ, OF NEW YORK, N. Y.

FLEXIBLE COUPLING.

Application filed May 21, 1921. Serial No. 471,403.

*To all whom it may concern:*

Be it known that I, ERNEST SCHWARZ, a citizen of the United States, and a resident of the city of New York, borough of the Bronx, in the county of Bronx and State of New York, have invented a new and Improved Flexible Coupling, of which the following is a full, clear, and exact description.

The present invention relates to new and useful improvements in shaft couplings, and it pertains more particularly to shaft couplings of the flexible type.

It is the primary object of the invention to provide a coupling for magnetos, generators and other accessories used in connection with internal combustion motor power plants.

Owing to the extreme reduced size of magneto and similar shafts, it is necessary that when the same is coupled for direct drive, the axial alinement of the two shafts should be perfect to prevent undue straining or binding of the armature shaft of the magneto, and it is a further object of the invention to provide a coupling which will accomplish this result.

In coupling magnetos to internal combustion motors, it is necessary that the same be properly timed in unison with the motor in order that the electric impulses generated by the magneto may be distributed at the proper time during the cycle of operation, and it is a further object of the present invention to construct a coupling by means of which the armature shaft of the magneto is adjustable relatively to the driving shaft to permit of a proper timing of the magneto.

With the above and other objects in view which will appear as the nature of the invention is more clearly understood, reference is had to the accompanying drawings, in which—

Figure 1 is a side elevation showing two shafts secured together by a coupling constructed in accordance with the present invention;

Fig. 2 is a longitudinal sectional view thereof;

Fig. 3 is a sectional view taken on the line 3—3 of Fig. 1, showing one end of the coupling in elevation, and Fig. 4 is a detail view of a portion of the coupling.

Referring more particularly to the drawings, the reference character 5 designates a driving shaft, and 6 designates a driven shaft. The shaft 5 is the so-called accessory shaft of an internal combustion motor, and the shaft 6 is the armature shaft of a magneto or generator, the driving shaft of a pump, or other accessory commonly employed.

The shaft 5 is provided with an opening 7 passing therethrough and carried by the end of the shaft 5 is a collar 8 secured to the shaft 5 by means of a bolt or the like 9, which passes through the opening 7, the collar 8 having oppositely disposed openings 10 to receive the bolt. This bolt 9 serves to secure the coupling member 12 to the shaft 5, and said coupling member 12 is preferably in the form of a tubular flexible member, such, for example, as a piece of tubular rubber. This coupling member 12 may be suitably reinforced by means of canvas or other reinforcing element and is similar in construction to ordinary rubber hose. Between the head and the nut of the bolt 9, suitable metal plates 10' are employed, these plates serving to prevent the nut or head of the bolt 9 from marring or tearing the flexible coupling member.

From the foregoing it is apparent that the present invention provides a flexible coupling for driving shafts and that the same permits of adjustment of one of the shafts relative to the other. When it is desired to make the adjustment, the clamping band 16 is loosened and upon removing the same the collar 14 carried by the shaft 6 will be capable of movement within the flexible coupling 12 until the same has been moved to the proper position, after which the band 16 is tightened, which establishes a driving connection between the shafts 5 and 6.

This form of coupling is especially adaptable for use in driving the armature shafts of magnetos since by its use it is not necessary that absolute alinement of the armature shaft and driving shaft be had, and, furthermore, by the construction which permits of the adjustment of the two shafts relative one to the other, a proper timing of the armature shaft to the magneto may be had.

I claim:

A flexible coupling for alined shaft members, comprising a collar keyed to one of said shaft members, said collar having a roughened outer surface, a flexible tubular member having its ends open, one of which ends is adapted to receive said collar having the roughened outer surface, a band for clamping said tubular flexible member about said collar, a collar carried by the opposite shaft member and having openings adapted to be brought into alinement formed radially through said shaft member, a bolt adapted to pass through the flexible member and through said alined openings, and clamping bands carried by said bolt and adapted to bind the flexible tubular member to the collar carried by the second-mentioned shaft member to provide a flexible coupling for the two shafts.

ERNEST SCHWARZ.